United States Patent
Bailey et al.

(10) Patent No.: US 9,632,700 B2
(45) Date of Patent: Apr. 25, 2017

(54) MANAGING A SHARED STORAGE SYSTEM USING HARDWARE IDENTIFIERS TO DETER DATA/FILE CORRUPTION

(71) Applicant: International Business Machines Corporation, Armonk, NY (US)

(72) Inventors: Kimberly T. Bailey, Raleigh, NC (US); Samuel E. Reynolds, Apex, NC (US); Wayne E. Rhoten, Morgan Hill, CA (US); Andrew K. Tracy, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 14/322,426

(22) Filed: Jul. 2, 2014

(65) Prior Publication Data

US 2016/0004442 A1    Jan. 7, 2016

(51) Int. Cl.
*G06F 3/06*      (2006.01)
*G06F 12/00*     (2006.01)
*G06F 17/30*     (2006.01)
*G06F 12/0813*   (2016.01)

(52) U.S. Cl.
CPC ............ *G06F 3/0604* (2013.01); *G06F 3/067* (2013.01); *G06F 3/0647* (2013.01);
(Continued)

(58) Field of Classification Search
CPC ...... G06F 3/067; G06F 12/0813; G06F 9/544; G06F 17/30165; G06F 3/0604;
(Continued)

(56) References Cited

U.S. PATENT DOCUMENTS 7,809,776 B1    10/2010  Witte et al.
7,996,636 B1    8/2011   Prakash et al.
(Continued)

FOREIGN PATENT DOCUMENTS

WO    WO 2006108088 A3 * 12/2006 ......... G06F 17/3028

OTHER PUBLICATIONS

Godoy, R., et al. "Identifier Management and Resolution: conforming the IEEE Standard for Learning Object Metadata", XIII Congreso Argentino de Ciencias de la Computación, VI Workshop de Tecnologia Informática Aplicada en Educación. pp. 967-975.
(Continued)

*Primary Examiner* — Tuan Thai
*Assistant Examiner* — Glenn Gossage
(74) *Attorney, Agent, or Firm* — Joseph W. Cruz

(57) ABSTRACT

A method, system, and computer program product for managing a storage facility are disclosed. A potential file overlay may be detected when performing a file transfer. When a file is common to multiple systems and resides on a shared system storage volume, potential file corruption due to a data transfer request is detected and then able to be prevented. Hardware identifiers such as Universal Unique Identifiers (UUIDs) are used in managing a write of a file to shared system storage. By comparing multiple hardware identifiers, a determination is made as to whether to process the write of the file. If the hardware identifiers mismatch, the write is processed. If the hardware identifiers match, a potential file overlay is detected. Because of the potential file overlay, the write is aborted and a failure notification is returned. A successful overwrite prevention notification may also be returned.

20 Claims, 5 Drawing Sheets

(52) U.S. Cl.
CPC ........ *G06F 3/0683* (2013.01); *G06F 12/0813* (2013.01); *G06F 17/30165* (2013.01)

(58) Field of Classification Search
CPC ................. G06F 3/0647; G06F 3/0683; H04L 29/08549; H04L 29/08306
See application file for complete search history.

(56) References Cited

U.S. PATENT DOCUMENTS

| | | |
|---|---|---|
| 8,156,080 B2 | 4/2012 | Beck |
| 8,194,660 B2 | 6/2012 | Birze et al. |
| 8,332,370 B2 | 12/2012 | Gattegno et al. |
| 2010/0250626 A1* | 9/2010 | Takaoka ................ G06F 17/302 707/812 |
| 2010/0254631 A1* | 10/2010 | Chien ............... H04L 29/12028 382/305 |
| 2011/0313972 A1* | 12/2011 | Albouze ........... G06F 17/30575 707/624 |
| 2012/0072558 A1 | 3/2012 | Beck |
| 2012/0143887 A1* | 6/2012 | Fontenot ............. H04L 61/2092 707/758 |
| 2013/0219462 A1 | 8/2013 | Aratsu et al. |

OTHER PUBLICATIONS

Unknown, "Configuring the FTP Binding Component for Clustering", Oracle. © 2010, Oracle Corporation and/or its affiliates. http://docs.oracle.com/cd/E19509-01/821-0826/jbi_cluster-ftp_p/index.html, (downloaded Feb. 19, 2014).

\* cited by examiner

MANAGING A SHARED STORAGE SYSTEM USING HARDWARE IDENTIFIERS TO DETER DATA/FILE CORRUPTION

BACKGROUND

This disclosure relates generally to computer systems and, more particularly, relates to managing a storage system. The amount of data that needs to be managed by enterprises is growing at an extremely high rate. Management of storage environments may need to be performed with as few errors as possible. As data needing to be managed increases, the need for management efficiency may increase.

SUMMARY

Aspects of the disclosure include a method, system, and computer program product for managing a storage facility (i.e., storage system) including managing a write of a file of a shared storage system. In accordance with the method, system, and computer program product of the present disclosure, the write is initiated from a client to the shared storage system. The shared storage system has a first hardware identifier for the file with respect to the client. In embodiments, hardware identifiers are Universal Unique Identifiers (UUIDs) configured to be direct access storage device (DASD) hardware identifiers.

In accordance with the method, system, and computer program of the present disclosure, a request is transmitted from the client to a peer for a second hardware identifier for the file with respect to the peer. In embodiments, the peer retrieves the second hardware identifier for the file with respect to the peer. The peer transmits/sends to the client the second hardware identifier for the file with respect to the peer. The client receives from the peer the second hardware identifier.

In accordance with the method, system, and computer program product of the present disclosure, a determination is made whether to process the write by comparing the first hardware identifier with the second hardware identifier. The write may be processed in response to the first hardware identifier mismatching the second hardware identifier. A triggering event may be instantiated in response to the first hardware identifier matching the second hardware identifier. In embodiments, instantiating the triggering event can include aborting the write, returning a write failure notification, or returning a successful overwrite prevention notification. Aspects of the disclosure provide a method for managing a shared storage system that may provide performance or efficiency benefits when writing to a file.

DETAILED DESCRIPTION

Figure 1:
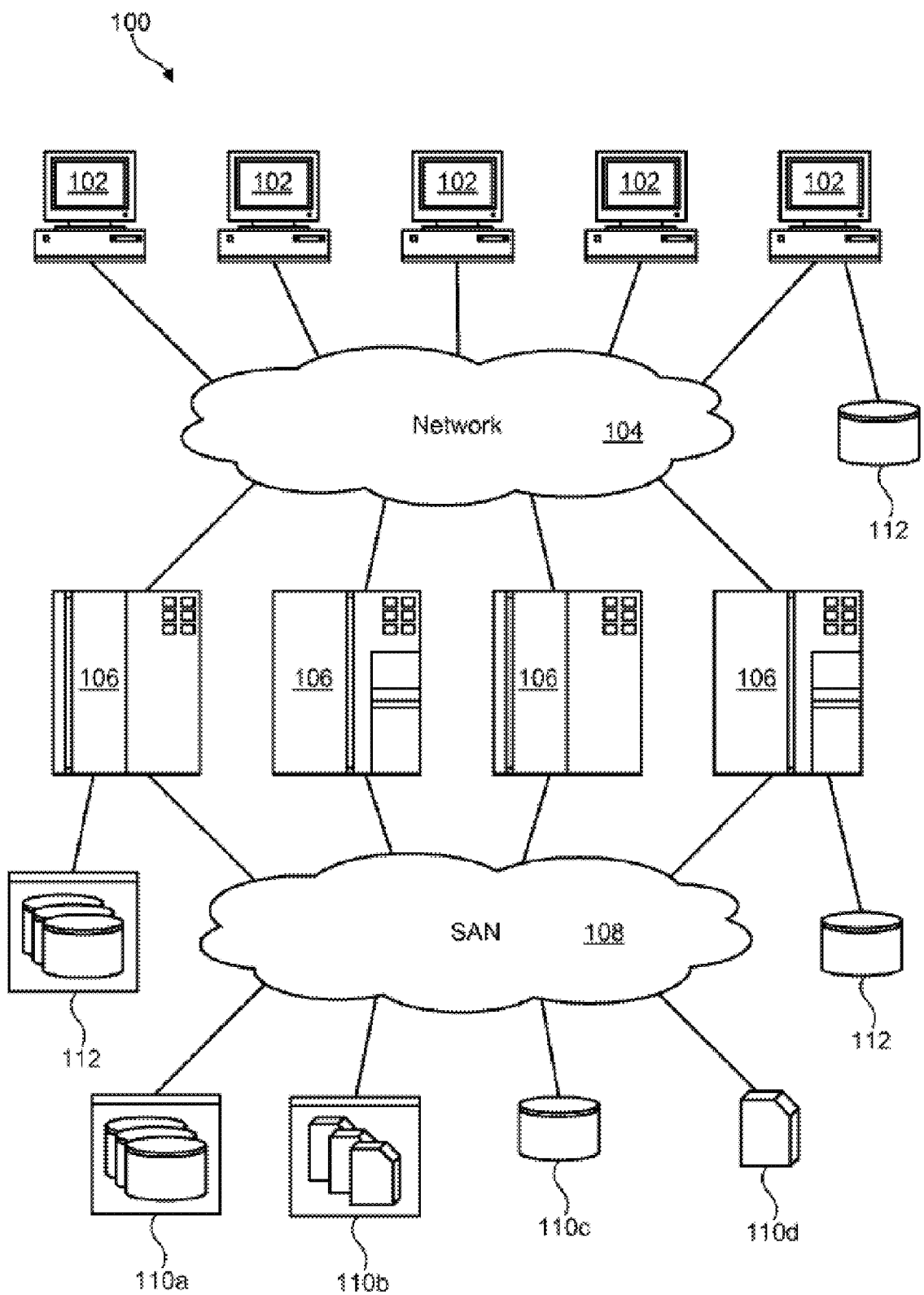
FIG. 1 illustrates an example network architecture according to embodiments.

Aspects of the disclosure include a method, system, and computer program product for detecting a potential file overlay when performing a file transfer. Consider an instance when writing a file from multiple clients to a direct access storage device (DASD) storage system. Another file existing on the DASD storage system may avoid corruption from the multiple file write requests (overlay of files) by using the DASD hardware identifier information (e.g., as part of a gatekeeping identifier solution). Managing a shared storage system in such manner may provide performance or efficiency benefits without large code changes.

When a file resides on a shared system storage volume, file corruption can occur if a data transfer request (unintentionally) happens for the same file which is shared between two systems. For example, a user may not be aware that the systems are sharing a file system and both have the same file. The user might invoke a file transfer application and the transferring application or process could delete or corrupt the common file as an unintended part of the transfer process.

In an example embodiment, the file transfer process obtains the unique number assigned by the manufacturer to the storage volume (the hardware serial number). The hardware serial number is available from the storage system using a systems interface (e.g., a documented systems interface). The file transfer process requests the hardware serial number for a specified file from the remote peer. The remote peer obtains the hardware serial number for its file system and replies to the request. The file transfer process compares the respective serial numbers. If the file names and serial numbers match, the file transfer is failed.

Aspects of the disclosure include a method, system, and computer program product for managing a storage facility (i.e., storage system). Including managing a write of a file of a shared storage system. The method, system, and computer program product may work with a number of operating systems. In accordance with the method, system, and computer program product of the present disclosure, the write is initiated from a client to the shared storage system The shared storage system has a first hardware identifier for the file with respect to the client. In embodiments, hardware identifiers are Universal Unique Identifiers (UUIDs) configured to be direct access storage device (DASD) hardware identifiers. The hardware identifiers can be included in a gatekeeper identifier solution and may be available from the shared storage system using a systems interface.

In accordance with the method, system, and computer program product of the present disclosure, a request is transmitted from the client to a peer for a second hardware identifier for the file with respect to the peer (the transmitting occurring in response to initiating the write from the client to the shared storage system). In embodiments, the peer retrieves the second hardware identifier for the file with respect to the peer (the retrieving occurring in response to transmitting from the client to the peer the request). The peer transmits/sends to the client the second hardware identifier for the file with respect to the peer (the transmitting/sending occurring in response to retrieving by the peer). In accordance with the method, system, and computer program product of the present disclosure, the client may receive from the peer the second hardware identifier (the receiving occurring in response to transmitting from the client to the peer the request for the second hardware identifier).

In accordance with the method, system, and computer program product of the present disclosure, a determination is made whether to process the write by comparing the first hardware identifier with the second hardware identifier. The write may be processed in response to the first hardware identifier mismatching the second hardware identifier. A triggering event may be instantiated in response to the first hardware identifier matching the second hardware identifier. In embodiments, instantiating the triggering event can include aborting the write, returning a write failure notification, or returning a successful overwrite prevention notification. In embodiments, the write may be managed using a file transfer protocol and without using a cluster configuration or a global resource manager. Aspects of the disclosure provide a method for managing a shared storage system that may provide performance or efficiency benefits when writing to a file.

FIG. 1 illustrates an example network architecture 100 according to embodiments. The network architecture 100 is presented to show one example of an environment where a system and method in accordance with the disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN), a wide-area-network (WAN), the Internet, an intranet, or the like. In certain embodiments, the computers 102, 106 may include both client computers 102 and server computers or servers 106 (also referred to herein as "host systems" 106 or alternatively as "host devices"). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as Advanced Technology Attachment (ATA), Serial Advanced Technology Attachment (SATA), Small Computer System Interface (SCSI), Serial Attached SCSI (SAS), Fibre Channel, or the like. One or more of the storage systems 112 may contain storage pools that may benefit from techniques of the disclosure.

The network architecture 100 may, in certain embodiments, include a storage network 108 behind the servers 106, such as a storage-area-network (SAN) or a LAN (e.g., when using network-attached storage). This network 108 may connect the servers 106 to one or more storage systems (alternatively, remote systems or remote devices), which may be generally referred to herein as storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system or server 106 may communicate over physical connections from one or more ports on the host system 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from techniques according to the disclosure.

In embodiments, techniques of the disclosure may permit the storage pools of storage systems 110, 112 to proactively deter data/file corruption. Therefore, the methodology provided may allow for performance or efficiency benefits when writing to a file in relation to the example network architecture 100 illustrated by FIG. 1.

Figure 2:
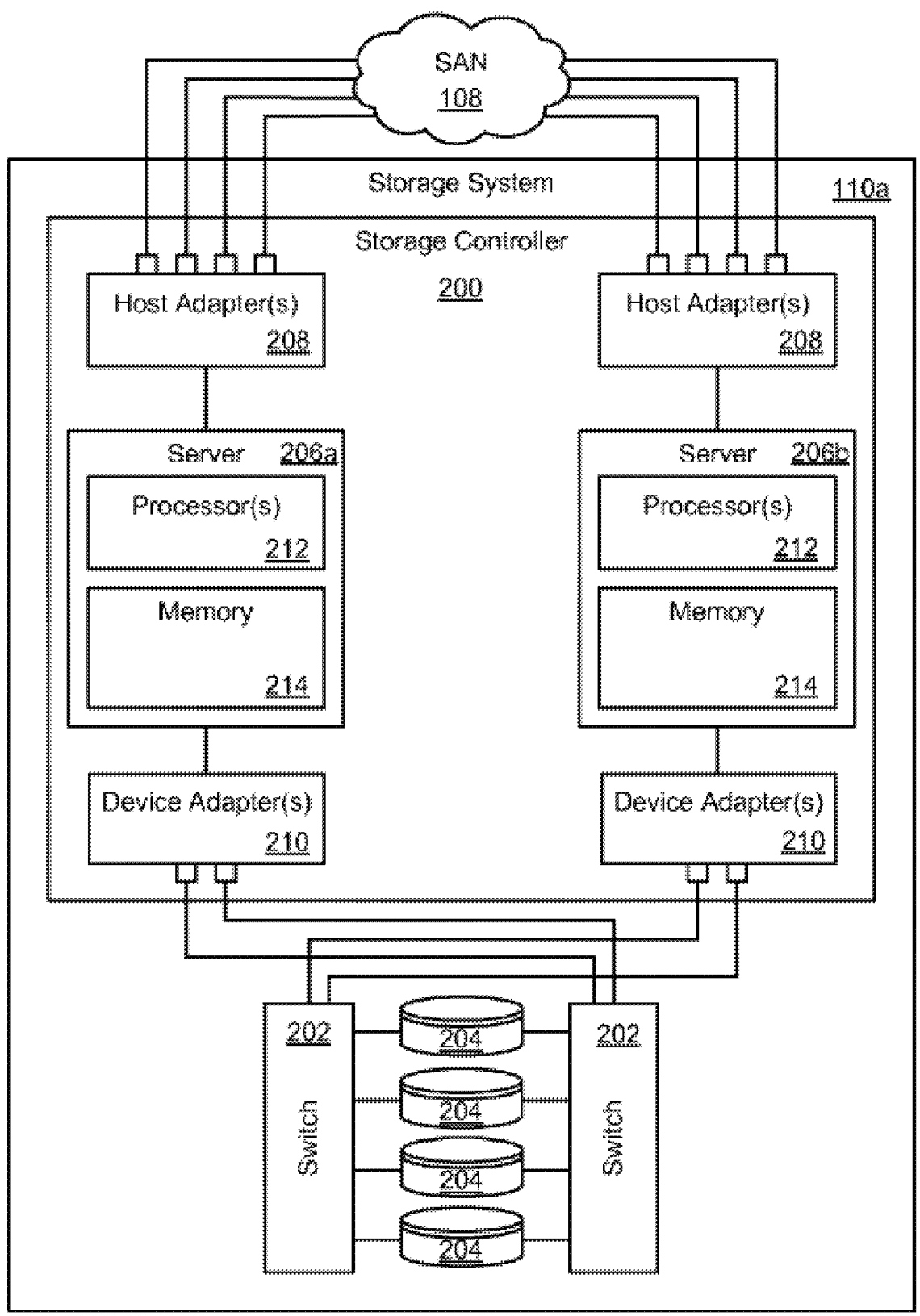
FIG. 2 illustrates an example storage system containing an array of storage devices according to embodiments.

FIG. 2 illustrates an example storage system 110a containing an array of storage devices 204 (e.g., hard-disk drives and/or solid-state drives) according to embodiments. The internal components of the storage system 110a are shown in accordance with the disclosure and may be used to manage such a storage system 110a. Nevertheless, techniques according to the disclosure may also be implemented within other storage systems 110, 112. As shown, the storage system 110a includes a storage controller 200, one or more switches 202, and one or more storage devices 204, such as hard-disk drives or solid-state drives (e.g., flash-memory-based drives). The storage controller 200 may enable one or more host systems 106 (e.g., open system and/or mainframe servers 106) to access data stored in the one or more storage devices 204.

The storage controller 200 includes one or more servers 206 (shown as 206a, 206b in FIG. 2). The storage controller 200 may also include host adapters 208 and device adapters 210 to connect the storage controller 200 to host devices 106 and storage devices 204, respectively. Multiple servers 206a, 206b may provide redundancy to ensure that data is always available to connected host devices 106. Thus, when one server 206a fails, the other server 206b may remain functional to ensure that I/O is able to continue between the host devices 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., Random Access Memory (RAM)) as well as non-volatile memory (e.g., Read-only Memory (ROM), Erasable Programmable ROM (EPROM), Electrically Erasable Programmable ROM (EEPROM), hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

In embodiments, techniques of the disclosure may permit the storage devices 204 to proactively deter data/file corruption. Therefore, the methodology provided may allow for performance or efficiency benefits when writing to a file in relation to the example storage system 110a containing an array of storage devices 204 illustrated by FIG. 2.

Figure 3:
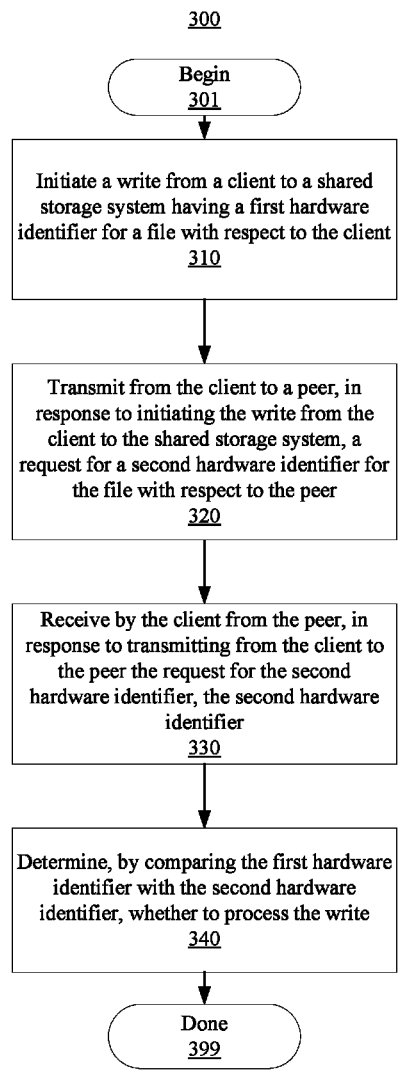
FIG. 3 is a flowchart illustrating a method for managing a shared storage system according to embodiments.

FIG. 3 is a flowchart illustrating a method 300 for managing a storage system according to embodiments, which includes managing a write of a file of a shared storage system. Method 300 may begin at block 301. At block 310, the method includes initiating a write from a client to a shared storage system. The shared storage system has a first hardware identifier for a file with respect to the client (e.g., the hardware volume being called by the client for the file). In embodiments, hardware identifiers are Universal Unique Identifiers (UUIDs) configured to be direct access storage device (DASD) hardware identifiers (e.g., a 128-bit value). The hardware identifiers may specifically describe the resource being defined (e.g., the UUID specifically describing a specific storage volume). The hardware identifiers can be included in a gatekeeper identifier solution (which may be a utility configured to prevent data collisions and resulting corruption) and may be available from the shared storage system using a systems interface (which describes the interface or interfaces between subsystems or to a system or subsystem such as particular protocols). In other embodiments, the hardware identifiers can include attributes such as dimensions, date put into use, or storage capability.

At block 320, the method includes transmitting, from the client to a peer, a request for a second hardware identifier for the file with respect to the peer (the transmitting occurring in response to initiating the write from the client to the shared storage system). In embodiments, the peer retrieves the second hardware identifier for the file with respect to the peer (e.g., the hardware volume which would be called by the peer for the file) (the retrieving occurring in response to transmitting from the client to the peer the request). The peer transmits/sends to the client the second hardware identifier for the file with respect to the peer (the transmitting/sending occurring in response to retrieving by the peer). At block 330, the method includes receiving by the client from the peer the second hardware identifier (the receiving occurring in response to transmitting from the client to the peer the request for the second hardware identifier).

At block 340, the method includes determining whether to process the write by comparing the first hardware identifier with the second hardware identifier. For example, two UUIDs are compared. The write may be processed in response to the first hardware identifier mismatching the second hardware identifier (e.g., the client's file and the peer's file are on different volumes—overlaying does not appear to be an issue). A triggering event may be instantiated in response to the first hardware identifier matching the second hardware identifier (e.g., the client and the peer seem to reference the same file on the same volume—overlaying may occur if writing is allowed to continue). In embodiments, instantiating the triggering event can include aborting/disallowing the write, returning a write failure notification, or returning a successful overwrite prevention notification (other possibilities are considered such as writing to a different but similar file name and sending an alert to the user of such or notifying the owner of the shared storage system of an overlay alert and locking down the entire shared storage system from use so as to prevent corruption potentially resulting from an overlay-based cyber-attack).

In embodiments, the write may be managed using a file transfer protocol and without using a cluster configuration or a global resource manager (e.g., minor changes to code may be used). In embodiments, an assurance check of the hardware identifiers may occur utilizing a hardware profile stored using a multi-dimensional array (e.g., the hardware profile may be stored on clients/peers and be set to update file/storage system information on a regular basis such as daily). The multi-dimensional array may include the filenames, the UUIDs and also timestamp information related to the particular files which are on volumes. For example, the array could have a first row [file1, 23480239840sdlkfj230948, 125423_01012012] and a second row [file2, 98908342908908dsdfjco012389, 221849_01022012]. Method 300 may conclude at block 399. Aspects of method 300 may provide performance or efficiency benefits when writing to a file. Altogether, a shared storage system may be managed more efficiently.

Figure 4:
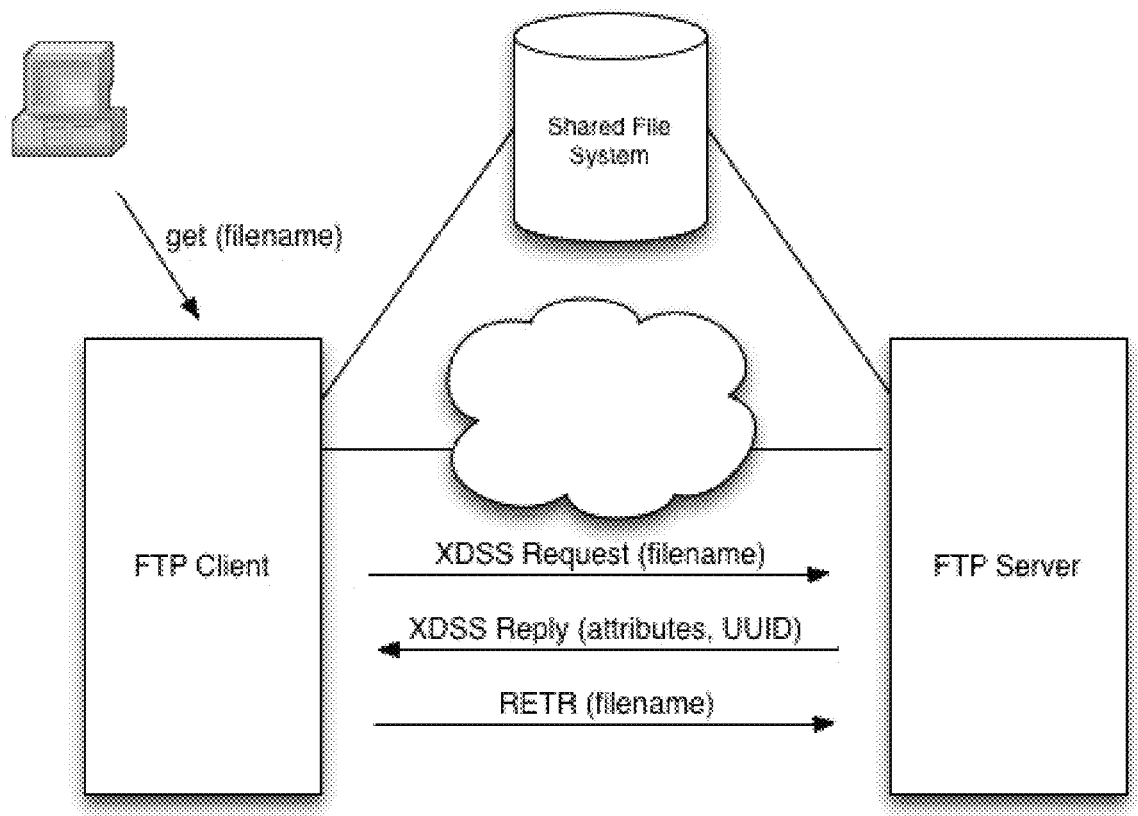
FIG. 4 depicts an example shared storage system according to embodiments.

FIG. 4 depicts an example shared storage system 400 according to embodiments. As shown, the hardware identifier (e.g., UUID, hardware serial number) may be obtained via system services from an operating system. The illustrative example describes a File Transfer Protocol (FTP) flow for communicating the hardware identifier between the FTP client and FTP server related to a file transfer request. The FTP client receives a get command for a filename and sends an XDSS request (e.g., data set attributes request) for the filename to the FTP server. The FTP server receives the XDSS request and replies (e.g., with attributes/UUID). The transfer command (RETR) for the filename may occur when no match of UUIDs is found.

Figure 5:
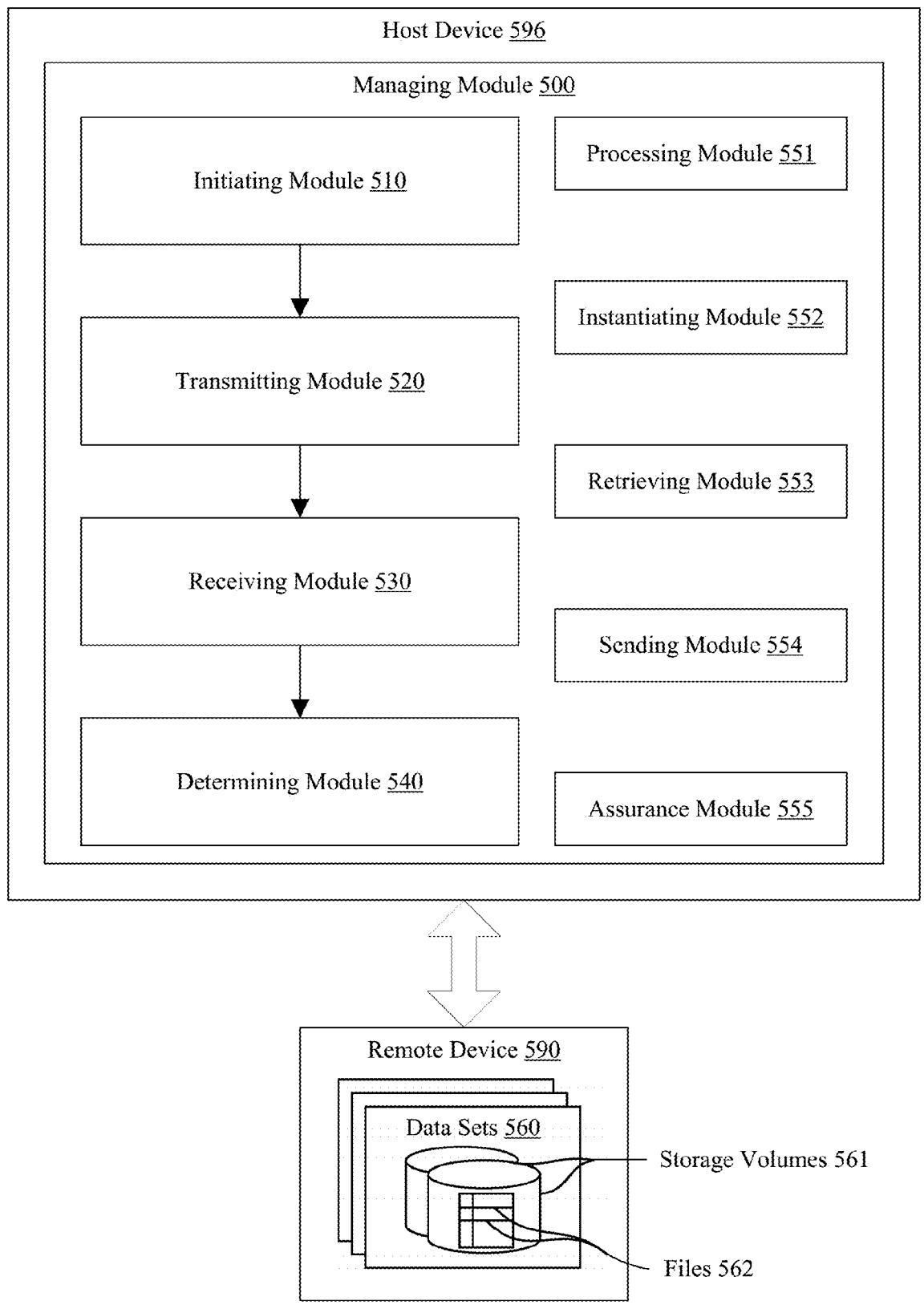
FIG. 5 shows modules of a system for managing a shared storage facility according to embodiments.

FIG. 5 shows modules of a system for managing a storage facility according to embodiments. In embodiments, method 300 may be implemented using one or more modules of FIG. 5. These modules may be implemented in hardware, software or firmware executable on hardware, or a combination thereof. For example, module functionality that may occur in a host device 596 may actually be implemented in a remote device 590 and vice versa. Other functionality may be distributed across the host device 596 and the remote device 590.

The host device 596 may include a managing module 500. The managing module 500 may be configured and arranged to manage a storage facility. The managing module 500 may include an initiating module 510, a transmitting module 520, a receiving module 530, a determining module 540, a processing module 551, an instantiating module 552, a retrieving module 553, a sending module 554, and an assurance module 555. The remote device 590 may have data sets 560 comprising storage volumes 561 having files 562.

The initiating module 510 initiates the write from a client to the shared storage system. The shared storage system has a first hardware identifier for the file with respect to the client (e.g., the hardware volume being called by the client for the file). In embodiments, hardware identifiers are Universal Unique Identifiers (UUIDs) configured to be direct access storage device (DASD) hardware identifiers (e.g., a 128-bit value). The hardware identifiers can be included in a gatekeeper identifier solution (which may be a utility configured to prevent data collisions and resulting corruption) and may be available from the shared storage system using a systems interface (which describes the interface or interfaces between subsystems or to a system or subsystem such as particular protocols).

The transmitting module 520 transmits, from the client to a peer, a request for a second hardware identifier for the file with respect to the peer (the transmitting occurring in response to initiating the write from the client to the shared storage system). In embodiments, the peer retrieves the second hardware identifier for the file with respect to the peer using the retrieving module 553 (e.g., the hardware volume which would be called by the peer for the file) (the retrieving occurring in response to transmitting from the client to the peer the request). The peer transmits/sends to the client the second hardware identifier for the file with respect to the peer using the sending module 554 (the transmitting/sending occurring in response to retrieving by the peer). The receiving module 530 receives, by the client from the peer, the second hardware identifier (the receiving occurring in response to transmitting from the client to the peer the request for the second hardware identifier).

The determining module 540 determines whether to process the write by comparing the first hardware identifier with the second hardware identifier. For example, two UUIDs are compared. The write may be processed by the processing module 551 in response to the first hardware identifier mismatching the second hardware identifier (e.g., the client's file and the peer's file are on different volumes—overlaying does not appear to be an issue). A triggering event may be instantiated by the instantiating module 552 in response to the first hardware identifier matching the second hardware identifier (e.g., the client and the peer seem to reference the same file on the same volume—overlaying may occur if writing is allowed to continue). In embodiments, instantiating the triggering event by the instantiating module 552 can include aborting/disallowing the write, returning a write failure notification, or returning a successful overwrite prevention notification (other possibilities are considered such as writing to a different but similar file name and sending an alert to the user of such).

In embodiments, the write may be managed using a file transfer protocol and without using a cluster configuration or a global resource manager (e.g., minor changes to code may be used). In embodiments, an assurance check, by the assurance module 555, of the hardware identifiers may occur utilizing a hardware profile stored using a multi-dimensional array (e.g., the hardware profile may be stored on clients/peers and be set to update file/storage system information on a regular basis such as daily). The multi-dimensional array may include the UUIDs and also timestamp information related to files 562 on volumes 561. Aspects of managing module 500 may provide performance or efficiency benefits when writing to a file. Altogether, a shared storage facility may be managed more efficiently.

A method, system, and computer program product for managing a storage facility is disclosed. The methodology detects a potential file overlay when performing a file transfer. When a file is common to multiple systems and resides on a shared system storage volume, potential file corruption due to a data transfer request is detected and then able to be prevented. Hardware identifiers such as Universal Unique Identifiers (UUIDs) are used in managing a write of a file to shared system storage. By comparing multiple hardware identifiers, a determination is made as to whether to process the write of the file. If the hardware identifiers mismatch, the write is processed. If the hardware identifiers match, a potential file overlay is detected. Because of the potential file overlay, the write is stopped or a failure notification is returned.

In a specific embodiment, the hardware identifiers can match and file identifiers mismatch. As such, it may be determined that a same storage medium is being accessed by two systems. Also, if the file system supports concurrent writes from multiple systems to the same storage medium, then the file transfer can benefit by writing directly to the local file system instead of by transferring data via another mechanism (e.g., via a telecommunications protocol and means). To illustrate further for a particular instance, the sending and receiving systems first transfer metadata about the file via TCP/IP. If the two systems share access to the storage medium, then the receiving system allocates space on the storage medium and the sending system writes to the storage medium and bypasses the telecommunications protocol, which may be slower. Next, the sending system signals the receiving system of the completion of the file transfer. Such transfer may be more efficient than if the file were transferred entirely via the telecommunications protocol.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se and specifically excludes transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA, SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A computer-implemented method for managing a write of a file of a shared storage system, the method comprising:
    initiating the write from a client to the shared storage system having a first hardware identifier for the file with respect to the client;
    transmitting from the client to a peer, in response to initiating the write from the client to the shared storage system, a request for a second hardware identifier for the file with respect to the peer;
    receiving by the client from the peer, in response to transmitting from the client to the peer the request for the second hardware identifier, the second hardware identifier; and
    determining, by comparing the first hardware identifier with the second hardware identifier, whether to process the write.

2. The method of claim 1, further comprising processing the write in response to the first hardware identifier mismatching the second hardware identifier.

3. The method of claim 1, further comprising instantiating a triggering event in response to the first hardware identifier matching the second hardware identifier.

4. The method of claim 3, wherein instantiating the triggering event includes aborting the write and returning a write failure notification.

5. The method of claim 1, wherein the first and second hardware identifiers are Universal Unique Identifiers (UUIDs) configured to be direct access storage device (DASD) hardware identifiers included in a gatekeeper identifier solution and available from the shared storage system using a systems interface.

6. The method of claim 1, further comprising:
    retrieving by the peer, in response to transmitting from the client to the peer the request for the second hardware identifier, the second hardware identifier for the file with respect to the peer; and
    transmitting by the peer to the client, in response to the retrieving by the peer, the second hardware identifier for the file with respect to the peer.

7. The method of claim 1, further comprising managing the write using a file transfer protocol and without using a cluster configuration or a global resource manager.

8. The method of claim 4, wherein instantiating the triggering event includes returning a successful overwrite prevention notification.

9. A system for managing a write of a file in a shared storage system, comprising:
    a remote device; and
    a host device, at least one of the remote device and the host device including a managing module, the managing module comprising:
        an initiating module to initiate the write from a client to the shared storage system having a first hardware identifier for the file with respect to the client;
        a transmitting module to transmit from the client to a peer, in response to initiating the write from the client to the shared storage system, a request for a second hardware identifier for the file with respect to the peer;
        a receiving module to receive by the client from the peer, in response to transmitting from the client to the peer the request for the second hardware identifier, the second hardware identifier; and
        a determining module to determine, by comparing the first hardware identifier with the second hardware identifier, whether to process the write.

10. The system of claim 9, further comprising a processing module to process the write in response to the first hardware identifier mismatching the second hardware identifier.

11. The system of claim 9, further comprising an instantiating module to instantiate a triggering event in response to the first hardware identifier matching the second hardware identifier.

12. The system of claim 11, wherein instantiating the triggering event includes aborting the write and returning a write failure notification.

13. The system of claim 9, wherein the first and second hardware identifiers are Universal Unique Identifiers (UUIDs) configured to be direct access storage device (DASD) hardware identifiers included in a gatekeeper identifier solution and available from the shared storage system using a systems interface.

14. The system of claim 9, further comprising:
    a retrieving module to retrieve by the peer, in response to transmitting from the client to the peer the request for the second hardware identifier, the second hardware identifier for the file with respect to the peer; and
    a sending module to transmit by the peer to the client, in response to the retrieving of the second hardware identifier by the peer, the second hardware identifier for the file with respect to the peer.

15. The system of claim 9, wherein the managing module manages the write using a file transfer protocol and without using a cluster configuration or a global resource manager.

16. The system of claim 12, wherein instantiating the triggering event includes returning a successful overwrite prevention notification.

17. A computer program product comprising a non-transitory computer readable storage medium having a computer readable program stored therein, wherein the computer readable program, when executed on a first computing device, causes the first computing device to:
    initiate a write from a client to a shared storage system having a first hardware identifier for a file with respect to the client;
    transmit from the client to a peer, in response to initiating the write from the client to the shared storage system, a request for a second hardware identifier for the file with respect to the peer;
    receive by the client from the peer, in response to transmitting from the client to the peer the request for the second hardware identifier, the second hardware identifier; and
    determine, by comparing the first hardware identifier with the second hardware identifier, whether to process the write.

18. The computer program product of claim 17, further comprising processing the write in response to the first hardware identifier mismatching the second hardware identifier.

19. The computer program product of claim 17, further comprising instantiating a triggering event in response to the first hardware identifier matching the second hardware identifier.

20. The computer program product of claim 17, wherein the first and second hardware identifiers are Universal Unique Identifiers (UUIDs) configured to be direct access storage device (DASD) hardware identifiers included in a gatekeeper identifier solution and available from the shared storage system using a systems interface.

* * * * *